United States Patent [19]

Brun

[11] Patent Number: 5,141,313
[45] Date of Patent: Aug. 25, 1992

[54] APPARATUS FOR PRODUCING A COLLIMATING MARK

[75] Inventor: Robert Brun, Zurich, Switzerland

[73] Assignee: Leica Heerbrugg AG (Schweiz), Heerbrugg, Switzerland

[21] Appl. No.: 717,610

[22] Filed: Jun. 21, 1991

[30] Foreign Application Priority Data

Jun. 25, 1990 [DE] Fed. Rep. of Germany ....... 4020150

[51] Int. Cl.⁵ ............................................. G02B 23/10
[52] U.S. Cl. .................... 356/251; 356/252; 33/246
[58] Field of Search ............... 356/247, 248, 251, 252, 356/152, 153; 33/241, 246

[56] References Cited

U.S. PATENT DOCUMENTS

| | | | |
|---|---|---|---|
| 4,097,155 | 6/1978 | Appert | 356/251 |
| 4,213,700 | 7/1980 | Leblanc | 356/252 |
| 4,385,834 | 5/1983 | Maxwell | 356/153 |
| 4,787,739 | 11/1988 | Gregory | 33/246 |

FOREIGN PATENT DOCUMENTS 3319392 11/1984 Fed. Rep. of Germany .
2119125 11/1983 United Kingdom .

Primary Examiner—Samuel A. Turner
Attorney, Agent, or Firm—Foley & Lardner

[57] ABSTRACT

An apparatus for producing a collimating mark within an optical sighting device includes a light source to generate a beam of light for the mark, imaging optics, and a beam splitter. The beam splitter reflects one portion of the light from the light source into a sighting ray path and directs another portion of light on to a two-dimensional photosensor matrix. From the signals generated by the matrix, the actual position of the collimating mark is determined. A ballistics computer predetermines a set position. Control signals are generated based on an actual position/set position comparison to permit the continuous movement of the collimating mark such that it indicates the elevation and lead angles relative to the optical axis of the sighting device. The signals generated by the photosensor matrix are also used to control the contrast of the collimating mark with respect to its immediate surroundings. Movement of the collimating mark is performed by tilting the imaging optics, displacing the light source, or by rotating wedges about an optical axis.

4 Claims, 3 Drawing Sheets

APPARATUS FOR PRODUCING A COLLIMATING MARK

BACKGROUND OF THE INVENTION

The invention relates to an apparatus for producing a collimating mark within an optical sighting device.

German Offenlegungsschrift 33 19 392, published on Nov. 29, 1984, discloses an optical sight for barreled weapons which has a collimating mark visible therein for lead and/or elevation marking. The mark is generated using light-emitting diodes and is optically superimposed in the sighting ray path. A stable and temperature-insensitive display is controlled directly by a computer. The brightness of the display is controlled so that the optical sight is suitable for both daytime and nighttime operations. For controlling the brightness of the display a light guide is coupled to each of the light-emitting diodes. The light-emitting diodes are arranged in a matrix manner in rows and columns. The diameter of the light guide is, at least at the point where light emerges, substantially less than the dimensions of the light-emitting diodes. The faces where light emerges are arranged next to one another and are connected to reflecting optics for combined reflecting into the sighting ray path. To obtain high resolution, a large number of light sources and light guides is necessary. The requirement for a large number of light sources and light guides makes assembly difficult and expensive.

United Kingdom Patent Publication GB-A 2119 125, published on Nov. 9, 1983, discloses an optical sighting device which has a lens, two prism arrangements, and an eyepiece as well as a collimating mark. The collimating mark is superimposed on the image to be observed and usually lies in the center of the image field. In this conventional apparatus, a mean value of the brightness of the overall target area is derived. The brightness of the collimating mark is compared with the mean value to control the brightness of the collimating mark. This control technique does not take into consideration the immediate surroundings of the collimating mark, that is, the contrast between the collimating mark and the background. Furthermore, control of the collimating mark with respect to the display of the ballistic aiming point is not performed.

SUMMARY OF THE INVENTION

It is an object of the invention, therefore, to provide an apparatus for producing a collimating mark that overcomes the disadvantages of the conventional devices discussed above.

It is another object of the invention to provide an apparatus for producing a collimating mark which permits adjustment of the position of the collimating mark relative to the optical axis of the sighting device under daytime and nighttime conditions, which represents both elevation and lateral lead simultaneously, and which provides a collimating mark that is readily visible even against an inhomogeneous or changing background.

According to a first aspect of the invention there is provided an apparatus for producing a collimating mark within an optical sighting device. The apparatus includes a light source to generate a beam of light for a collimating mark, imaging optics to direct the beam of light emanating from the light source, a two-dimensional photosensor matrix to generate signals indicative of incident light, a beam splitter to reflect a portion of light from the imaging optics into a sighting path of the optical sighting device and to direct another portion of light from the imaging optics on to the photosensor matrix, and an assembly to deflect the beam of light from the light source in two dimensions. A computer receives the signals from the photosensor matrix and uses the signals to determine an actual position of the collimating mark. The computer generates control signals based on a comparison of the actual position with a set position to control the assembly to permit continuous movement of the collimating mark. The control signals correspond to an angle of elevation and an angle of lead. The computer also controls the contrast of the collimating mark with respect to the region immediately surrounding the collimating mark using the signals generated by the photosensor matrix.

Movement of the collimating mark is performed by tilting the imaging optics, displacing the light source, or by rotating wedges about an optical axis.

Other objects, features, and advantages of the invention will be apparent from the following detailed description of preferred embodiments.

BRIEF DESCRIPTION OF THE DRAWINGS

The invention will be described in further detail below with reference to the accompanying drawings, wherein.

Figure 1:
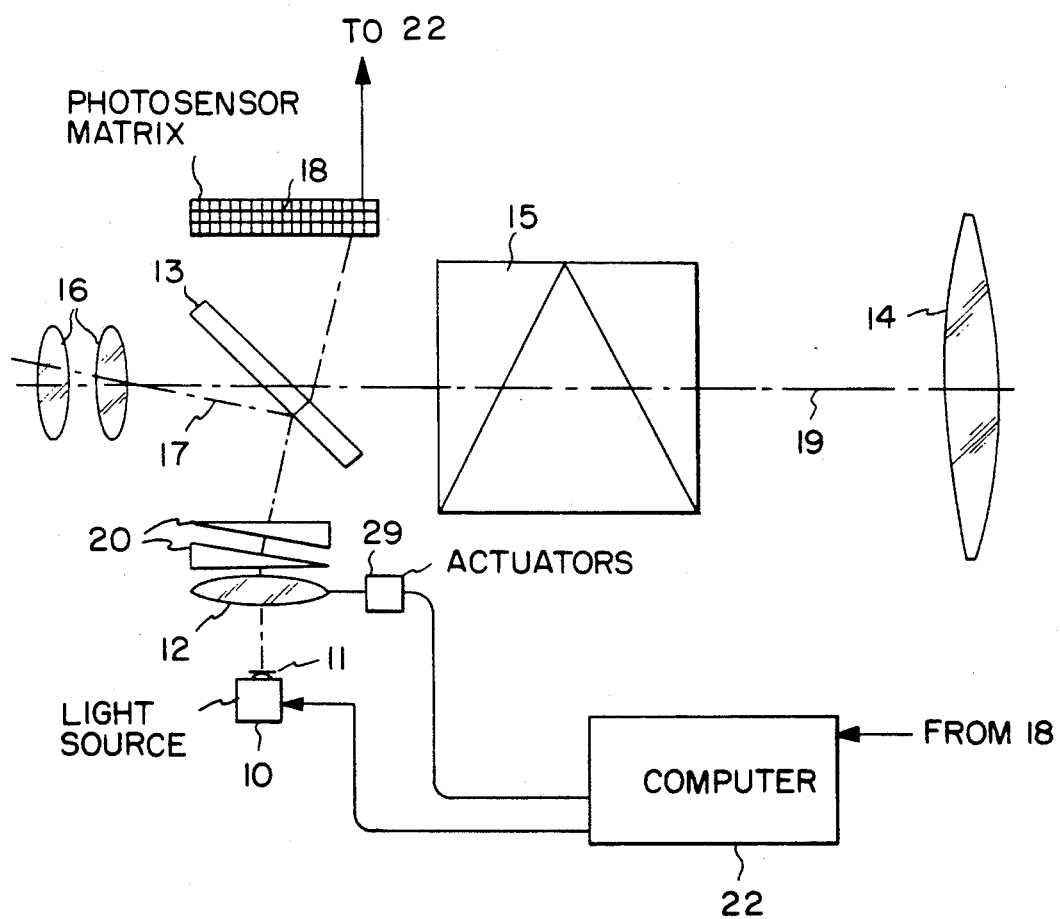
FIG. 1 illustrates an apparatus for generating a collimating mark according to a preferred embodiment of the invention.

Items well known or not relevant to the invention are not shown in the drawings.

DETAILED DESCRIPTION OF PREFERRED EMBODIMENTS

The invention has several advantages over conventional devices. First, only one active light source is required. Second, the light source does not have to be miniaturized. Third, the functions that require high-density resolution and a large number of image points are performed by a passive photosensor matrix that is available in many forms and many sizes as compared with active light-emitting diode matrices. Fourth, by utilization of a set/actual comparison, once an adjustment of the collimating mark relative to the optical axis of the sighting device has been chosen, the setting is maintained even when temperature changes occur over time and when individual components experience aging-related variation. Fifth, the collimating mark is visible due to high contrast at all times.

Movement of the collimating mark for simultaneous representation of both elevation and lateral lead requires deflection of the beam of rays emanating from a light source in two directions. The angle of elevation and the angle of lead is predetermined by a ballistics computer. In one embodiment of the invention, this deflection is performed by tilting the imaging optics or the light source. This deflection can also be accomplished by displacing the light source or by rotating two wedges, as will be described in further detail below.

FIG. 1 illustrates a preferred embodiment of the invention. In the FIG. 1 preferred embodiment, a light source 10, for example a light emitting diode (LED), directs light through an aperture 11 to generate a collimating mark in the form of a point. It is understood that other shapes, such as a ring or a cross, can also be generated. The light emanating from the light source 10 and aperture 11 passes through imaging optics 12 and is reflected by a beam splitter 13 into the optical path of the light rays of the sighting device. The sighting device includes a telescope with a lens 14, a reversing prism 15, and an eyepiece 16. The image of the collimating mark lies in the plane of the intermediate image 17 of the telescope and is viewed using the eyepiece 16 together with the scene, which is projected through the lens 14.

A component of light from the aperture 11 passes through the beam splitter 13 and impinges on a two-dimensional photosensor matrix 18. The photosensor matrix 18 is secured to the telescope and to a housing (not shown). The photosensor matrix 18 determines the actual position of the collimating mark relative to the optical axis 19 of the sighting device and transmits this information to a computer 22. If a deviation from coordinates set in the computer 22 occurs, the computer 22 adjusts the apparatus, as will be described in further detail below. The set position is predetermined by the ballistics computer.

The computer 22 controls the apparatus to ensure that the correct position of the collimating mark relative to the optical axis 19 of the sighting device is maintained under all conditions. The position of the collimating mark will tend to vary due to, for example, changes in ambient temperature and aging-related changes in the components.

Figure 2:
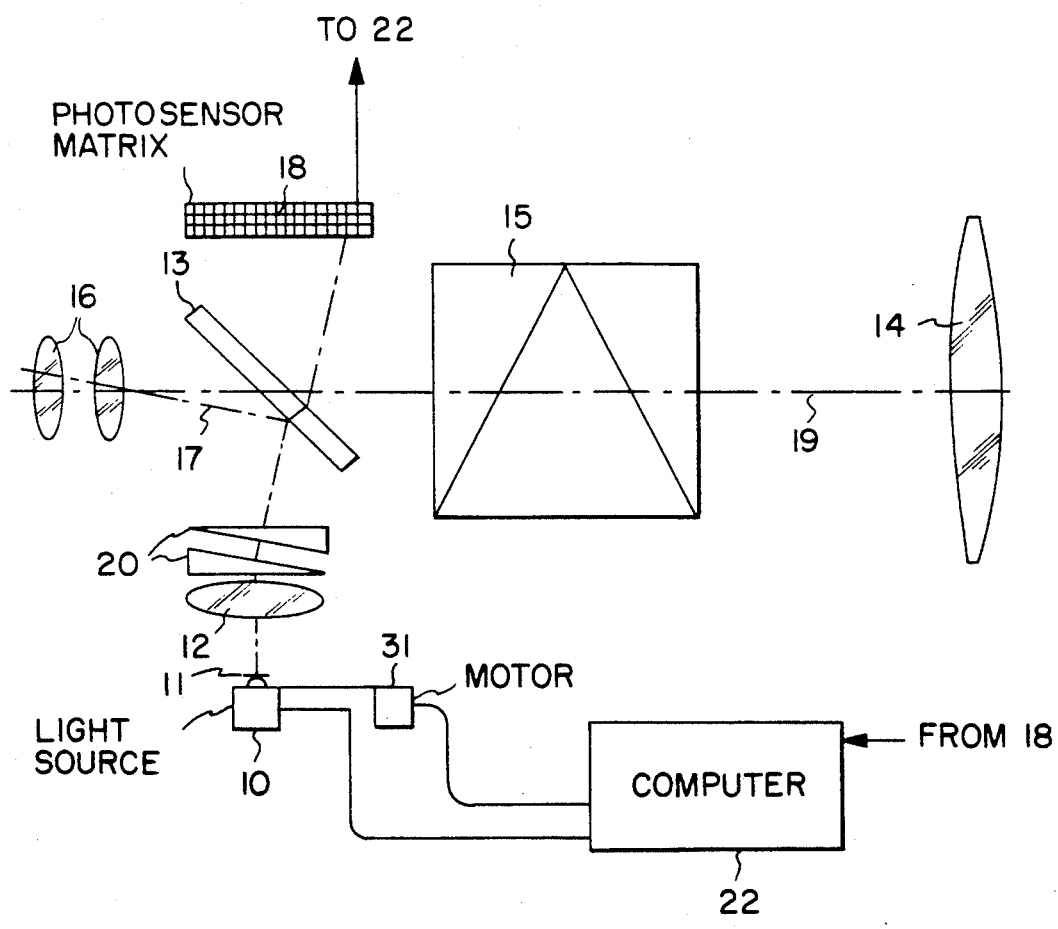
FIG. 2 illustrates a second embodiment of the invention.
Figure 3:
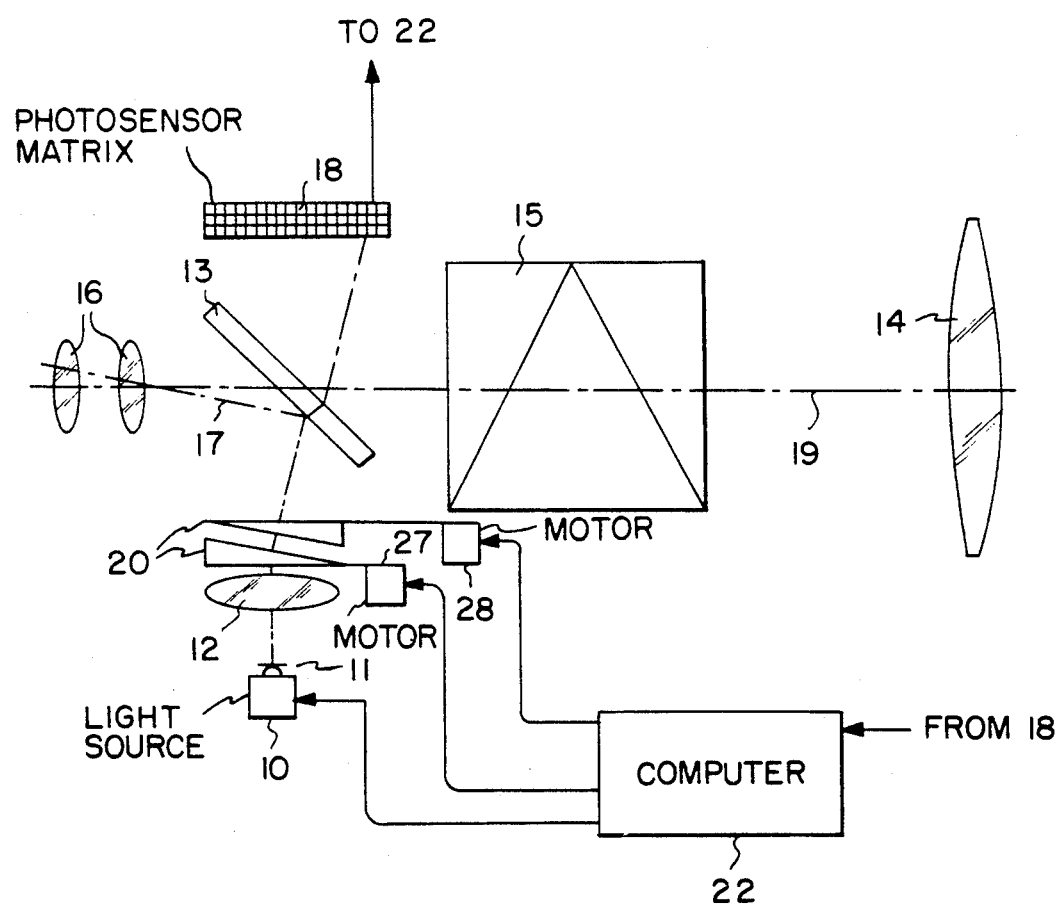
FIG. 3 illustrates a third embodiment of the invention.

Movement of the collimating mark requires guiding or deflection of the beam of rays emanating from the light source 10 in two directions. Deflection can be performed by tilting the imaging optics 12, for example, by means of piezoelectric actuators 29, about two orthogonal axes, as illustrated in FIG. 1. Lateral displacement of the light source 10 using a motor 31 can also be used to move the collimating mark, as illustrated in FIG. 2. Alternatively, the imaging optics 12 can remain fixed in place and rotating wedges 20 can be provided between the imaging optics 12 and the beam splitter 13 to deflect the light rays. Movement of the rotating wedges 20 can be performed using electric motor actuators 27 and 28 which are controlled by computer 22, as illustrated in FIG. 3.

In addition to performing the functions described above, the computer 22 processes signals received from the photosensor matrix 18 and determines which image elements surround the set position of the collimating mark. The intensity of the signals received from these elements of the photosensor matrix 18 is a measure of the brightness of the background of the scene at the image location of the collimating mark and in the region surrounding the collimating mark. Using these brightness values, the computer 22 controls the intensity of the light source 10 so that the collimating mark in each case appears with a high contrast against the background.

The detailed description and specific examples set forth above are given by way of illustration only. Various changes and modifications within the spirit and scope of the invention will be apparent to those skilled in the art from the description set forth above.

What is claimed is:

1. An apparatus for producing a collimating mark within an optical sighting device, said apparatus comprising:
    (a) a light source to generate a beam of light for a collimating mark;
    (b) imaging optics to direct said beam of light emanating from said light source;
    (c) a two-dimensional photosensor matrix to generate signals indicative of incident light;
    (d) a beam splitter to reflect a portion of light from said imaging optics into a sighting path of said optical sighting device and to direct another portion of light from said imaging optics on to said photosensor matrix;
    (e) an assembly for guiding the beam of light from said light source in two dimensions; and
    (f) a computer which receives said signals from said photosensor matrix and uses said signals to determine an actual position of said collimating mark, said computer generating control signals based on a comparison of said actual position with a set position to control said assembly, said control signals corresponding to an angle of elevation and an angle of lead, said computer also controlling a contrast of said collimating mark with respect to a region immediately surrounding said collimating mark using said signals generated by said photosensor matrix.

2. An apparatus as set forth in claim 1, wherein said assembly tilts said imaging optics about two mutually independent axes to move said collimating mark.

3. An apparatus as set forth in claim 1, wherein said assembly moves said light source in two mutually independent directions to move said collimating mark.

4. An apparatus as set forth in claim 1, wherein said assembly includes two wedges that are rotated about an optical axis to move said collimating mark.

* * * * *